United States Patent [19]

Reneau

[11] Patent Number: 4,671,539
[45] Date of Patent: Jun. 9, 1987

[54] REMOTELY OPERABLE FLOWLINE CONNECTOR

[75] Inventor: Bobby J. Reneau, Houston, Tex.

[73] Assignee: Gripper, Inc., Houston, Tex.

[21] Appl. No.: 646,903

[22] Filed: Aug. 31, 1984

[51] Int. Cl.$^4$ .............................. F16L 27/04
[52] U.S. Cl. .................... 285/18; 285/920; 285/261; 285/265; 285/315
[58] Field of Search ............. 285/18, 98, 276, 184, 285/317, 267, 265, 261, DIG. 21, 24, 86, 315

[56] References Cited

U.S. PATENT DOCUMENTS

| | | | |
|---|---|---|---|
| 3,695,633 | 10/1972 | Hanes | 285/DIG. 21 |
| 3,874,706 | 4/1975 | Arnold | 285/DIG. 21 |
| 3,997,197 | 12/1976 | Marsh et al. | 285/DIG. 21 |
| 4,040,650 | 8/1977 | Shotbolt | 285/18 |
| 4,045,054 | 8/1977 | Arnold | 285/184 |
| 4,082,320 | 4/1978 | Weinhold | 285/261 |
| 4,139,221 | 2/1979 | Shotbolt | 285/DIG. 21 |
| 4,180,285 | 12/1979 | Reneau | 285/272 |
| 4,298,219 | 11/1981 | Amelink | 285/261 |

FOREIGN PATENT DOCUMENTS

| | | | |
|---|---|---|---|
| 129517 | 10/1979 | Japan | 285/DIG. 21 |
| 2058984 | 4/1981 | United Kingdom | 285/184 |

Primary Examiner—Cornelius J. Husar
Assistant Examiner—Eric K. Nicholson
Attorney, Agent, or Firm—Pravel, Gambrell, Hewitt & Kimball

[57] ABSTRACT

The remotely operable ball connector includes a female member having a remotely operable locking assembly thereon which receives an articulated ball member, which ball member has mounted thereon an over-center locking ring assembly for moving the ball member into a locking position in the female member and for receiving a plurality of inwardly moving radial locking fingers to connect the ball member to the female member.

7 Claims, 2 Drawing Figures

REMOTELY OPERABLE FLOWLINE CONNECTOR

TECHNICAL FIELD OF THE INVENTION

This invention relates to apparatus for connecting together first and second flowlines or pipelines. For example, the apparatus of this invention may be used to connect together first and second flowline members at extensive underwater depths using a remotely operable vehicle.

BACKGROUND OF THE INVENTION

As the search for oil offshore has moved drilling activity into deeper and deeper water, the necessity has increased for various equipment to be operable at such extensive water depths. In order to operate at such extensive depths, the utilization of a Remotely Operated Vehicle (ROV) has become more and more common. An ROV is a propeller driven, fully remotely operable underwater vehicle utilizing TV cameras for eyes and having gripping arms and hydraulic power connections for latching, unlatching and performing other operating functions as such extensive depths. The ROV can be completely controlled from a surface vessel and thus offers the tremendous advantage of avoiding the endangerment of human life.

As part of production operations relating to the completion of such deeply drilled oil and gas wells, it is necessary to run pipelines from the producing well on the ocean floor to surface collection facilities. It is also necessary to run larger pipelines from a collection terminal to shore or other collection points. In laying such pipelines, it is necessary to connect together the pipeline sections at such extensive depths. In one particular environment, a pipeline must extend from a producing, ocean floor location to the leg of a riser and up the riser to some type of surface collection facility. In one method of installation, a riser pipe extends down the riser and terminates in an end which must be connected to a pipeline laid along the ocean floor from a wellhead. In such method of installation, the pipeline extending from the wellhead is laid into the water and floats down to the ocean floor and terminates in a ball-type connection which must be aligned with and locked into engagement with a cup or female connection at the end of the riser pipe. After the pipeline which terminates in the ball portion is laid onto the ocean floor, it can be moved into alignment with the female or cup member at the end of the riser pipe by various methods. It is then necessary to hydraulically make the locking connection between the ball member of the flowline on the ocean floor and the cup member at the end of the riser pipe. There are also many other instances wherein it is necessary to connect together pipeline ends utilizing remotely operable hydraulic power.

One such apparatus that may be used to make this connection is disclosed in U.S. Pat. No. 4,180,285 entitled "Articulated Ball Connector for Use With Pipeline". In U.S. Pat. No. 4,180,285, the female or cup portion includes a hydraulically actuable assembly which includes a piston member for actually moving a plurality of radial locking rings downwardly into a groove on a clamping ring mounted on the ball member. The position of the clamping ring mounted on the ball member is supported by a series of hydraulically interconnected piston assemblies which are provided to articulate the clamping ring on the ball member into a mating position with the cup member.

SUMMARY OF THE INVENTION

The apparatus of this invention is provided for the purpose of connecting together a first and second flowline members wherein hydraulic power is available to the female or cup-shaped member, which may be mounted onto the end of a riser pipe or at another location. The apparatus includes a female member adapted to be connected to a first flowline, the female member having a cup portion formed of a concave interior surface. A male member is adapted to be connected to the second flowline, the male member having a ball end portion having a substantially spherical outside surface which includes a nose section for fitting into mating engagement with the concave interior surface of the female member. The male member has mounted over the substantially spherical outside surface an over-center mounting ring assembly. The over-center mounting ring assembly is mounted over a diametrical apex of the spherical outside surface of the male or ball member such that the over-center mounting ring is held in position on the male member and is capable of articulation with respect thereto. The female member includes a locking assembly for receiving the over-center mounting ring of the male member. The locking assembly further includes a radial locking mechanism for moving a plurality of radial locking fingers into locking engagement with the over-center mounting ring on the ball member to lock together the ball member and the female or cup member.

This summary of the invention does not necessarily include all of the patentable features of the invention and is merely being provided as an introduction to the description of the preferred embodiment to follow.

DESCRIPTION OF THE PREFERRED EMBODIMENT

Figures 1, 2:
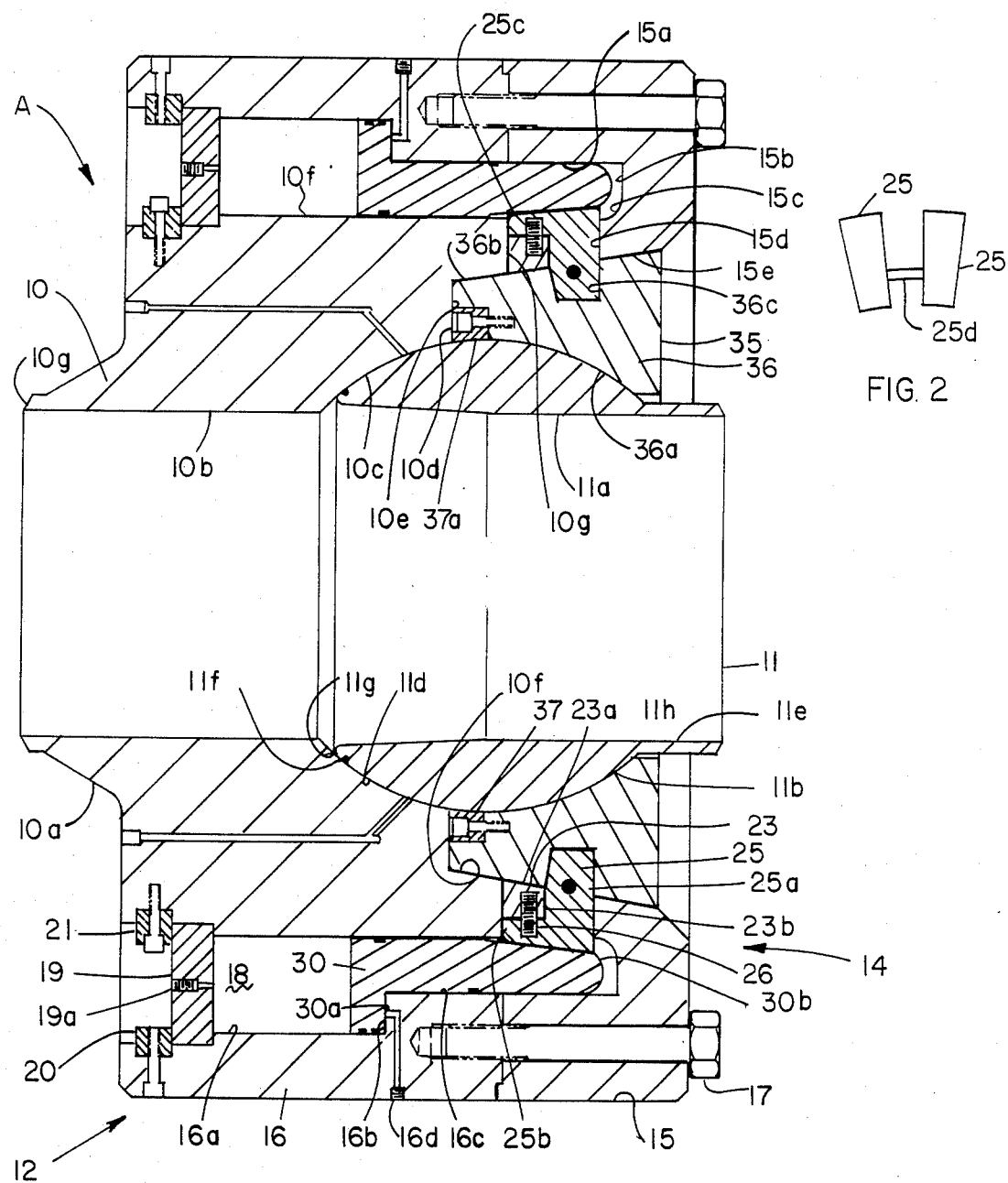
FIG. 1 is a sectional view of the remotely operable flowline connector of the preferred embodiment of this invention with the male or ball member illustrated in a locked position in the female or cup member.
FIG. 2 is an axial view of two of the radial locking segments illustrating the spring mechanism which holds the locking segments in circumferential position.

Referring to the drawings, the letter A designates the remotely operable flowline connector of the preferred embodiment of this invention. The remotely operable flowline connector basically includes a female or cup member 10 which is adapted to be welded to a first flowline and a male or ball member 11 which is adapted to be welded to a second flowline. The purpose of the apparatus A is to provide for a reliable hydraulically actuated locking connection between the female member 10 and the male member 11 in order to connect together the first and second flowlines (not shown) which are attached to the members 10 and 11.

The female member 10 includes a main, generally cylindrical body 10a which includes an internal bore portion 10b of substantially the same size as the bore of the first flowline to which the female member 10 is to be connected. The main body 10a further includes a cup portion 10c which is formed of a substantially spherical or concave interior surface. The interior concave surface 10c terminates at its leading end 10d in an annular radial face 10e which terminates in an outwardly tapered, frustro-conical surface 10f. The outwardly tapered frustro-conical surface 10f terminates in an outer annular, radial face 10g. The main body 10a further includes an outer cylindrical surface 10f which intersects the front outer annular radial face 10g at the forward end of the main body 10a. The main body 10a terminates in a rear connecting rim portion 10g which is adapted to be welded to a first flowline. The angular displacement or distance of the interior concave surface 10c is less than 90° in the plane of the drawing such that it is defined as an under-center, concave surface.

The main body 10a has mounted thereon a locking assembly which is generally designated as 12. The locking assembly 12 includes a radial lock means generally designated as 14 for movement into radial locking engagement with the male member 11. The locking assembly 12 includes a front mounting ring 15 which is mounted onto the front annular face 10g of the main body 10a and extends radially outwardly therefrom. The front mounting ring 15 is attached to an outer, cylindrical body member 16 by a plurality of circumferentially spaced bolts 17. The outer cylindrical body member 16 has a generally cylindrical inside surface or wall 16a which is spaced from the cylindrical outside surface 10f of the main body member 10a in order to provide an annular cavity 18. The annular cavity is closed by a rear closing or mounting ring 19 which is mounted in aligned grooves in the outside surface 10f of the main body and in the inside surface 16a of the outer cylindrical body member. The rear mounting ring 19 is held in position by an outside split ring assembly 20 mounted in a groove in the surface 16a of the outer cylindrical body member and held in position by a plurality of set screws. Similarly, an inside split ring 21 is mounted in a groove in the outer surface 10f of the main body member 10a and held in position by a plurality of set screws. The outer split ring assembly 20 and the inner split ring assembly 21 are positioned to engage and hold in position the rear connecting or mounting ring 19. The inside surface 16a of the outer cylindrical body member 16 includes an internally directed radial face or shoulder 16b which terminates in an inner cylindrical surface 16c also spaced from the outer cylindrical surface 10f of the main body member 10a.

The front mounting ring 15a includes an annular cavity portion, which by definition is part of cavity 18, formed of an interior cylindrical surface 15a of the same diameter as interior cylindrical surface 16c of the outer cylindrical body member 16. The front mounting ring 15 further includes a radial face 15b, a cylindrical surface portion 15c and an internal radial face 15d. An internal mounting ring 23 is attached to the front annular radial face 10g and includes an inside, frustro-conical surface 23a which aligns with the inside frustro-conical surface 10f of the main body 10a. The mounting ring 23 further includes a radial face 23b which is spaced from the rearwardly facing radial face 15d of the front mounting ring 15 to provide an annular groove which is open to the inside cavity 18 formed between the main body 10a and outer cylindrical body member 16.

The mounting ring 15 includes an internal, frustro-conically tapered surface 15e which is tapered inwardly toward internal concave surface 10c. The frustro-conical surface 15e cooperates with frustro-conical surfaces 23a and 10f to provide a continuous, tapered frustro-conical guide surface to guide the male or ball member 11 into the locking position of FIG. 1.

The radial lock means 14 further includes a plurality of circumferentially spaced radial locking fingers each of which is designated by the number 25. The locking fingers 25 are mounted in the annular groove formed between the front mounting ring 15 and the internal mounting ring 23 and extend into the cavity 18. The radial locking fingers 25 are circumferentially spaced within the annular groove and are held in such circumferentially spaced relationship, as viewed in FIG. 2 schematically, by spring elements 25d which are positioned between the individual radial locking fingers 25. Each radial locking finger, as viewed in cross-section as shown in FIG. 1, is L-shaped and includes a radially directed portion 25a and an axially directed portion 25b. The radially directed portion 25a includes a U-shaped end portion as viewed in the cross-section of FIG. 1 for insertion into locking engagement with the over-center ring assembly 36 of male member 11 to be described hereinafter. The internal mounting ring 23 includes a plurality of radially spaced bores which house radially directed springs 26 which extend into aligned bores in the axially directed portions 25b of each of the radial locking elements 25. The radially directed springs 26 urge the radial locking fingers 25 radially outwardly into the cylindrical cavity 18 thus holding the radial portion 25a in a withdrawn position. In such withdrawn position, the radial portion 25a of each of the locking fingers 25 is held inwardly such that the internal, frustro-conical inwardly tapered surface 15e of the front mounting ring 15 is uninterrupted in its alignment with the internal frustro-conical surface 23a of the internal mounting ring 23 so that a smooth, uninterrupted funnel-shaped surface area is provided to guide in the male member 11.

Each of the radial locking fingers 25 includes in its axial portion 25b an outer, rearwardly tapered curved surface portion 25c. The radial lock means 14 further includes an annular piston 30 which is mounted within the cavity 18 for axial movement forwardly into engagement with each of the radial locking fingers 25 for moving the radial locking fingers 25 radially inwardly into locking engagement with the male member 11. The annular piston 30 includes a shoulder portion 30a which aligns with and is seated against internal shoulder portion 16b of the outer cylindrical body member 16 when the piston 30 is in its forward, actuated position. The cooperation of the piston outer shoulder 30a and the internal shoulder 16b of the body member 16 act to limit the forward movement of the piston 30, forward movement being defined as movement of the piston 30 toward the radial locking fingers 25. The front portion of the piston 30 includes an internal, curved camming surface 30b which initially engages the outer camming surface 25c on each of the radial locking fingers 25 to engage and cam radially inwardly the radial locking fingers 25 as the piston 30 is moved forwardly in the cavity 18. The position of the outer camming surface 25c on each of the radial locking fingers 25 is always radially inwardly of the inner facing, curved camming surface 30b on the piston 30 such that the piston 30 holds the radial locking fingers in position to cause a cooperation between piston surface 30b and radial locking surface 25c as the piston 30 moves forward to move the radial locking fingers 25 inwardly. In order to provide hydraulic fluid under pressure to move the piston 30 from its initial position within the cavity 18, which position is shown in dotted lines, to the final position illustrated in FIG. 1, hydraulic fluid under pressure is directed through port 19a in the rear mounting ring 19. For the purposes of testing and releasing any protectors, hydraulic fluid can be introduced through port 16d in the outer cylindrical body member 16 to direct fluid against piston shoulder 30a to move the piston rearwardly.

The male member or ball member 11 is a generally cylindrical member having a ball end portion 11a having an outer substantially spherical surface 11b. The outer substantially spherical surface 11b includes a front or forward spherical outside surface portion 11d, which is defined as the nose portion, which is adapted to seat against the internal, spherically concave surface 10c of the main body 10a of the female member 10. The body 11a of the male member 11 terminates in a rear pipe section 11e which is adapted to be welded to a second flowline. The connection of the male member 11 with and into the female member 10 is for the purpose of providing an articulated connection between the first and second flowline portions (not shown). The diameter of the nose portion 11d is slightly greater than the internal diameter of the spherical concave surface 10c so that a metal-to-metal seal is provided between the surfaces when the ball member 11 is locked into engagement with the cup member 10. A groove 11f is machined into the outside surface of the nose portion 11d to further effect the metal-to-metal seal between the nose portion surface 11d and the internal, spherically concave surface 10c of the female member 10. For the purposes of definition, the nose portion 11d may be defined as terminating in a leading end 11g and the outer spherical surface 11b may also be defined as being spherically convex. Further, the ball member body 11a includes an internal cylindrical wall 11h which defines a bore which is generally alignable with the bore 10b of the female member 10. The bore 11h may be defined as flaring outwardly toward the leading end 11g of the ball member such that a substantially uninterrupted internal bore is provided even though the ball member is slightly pivoted from center with respect to the central axis of the internal bore of the female member 10.

An over-center mounting ring assembly 35 is mounted over the external, spherically convex surface 11b of the male member 11 for rotating, pivotal or articulated movement over the exterior spherical surface. The over-center mounting ring assembly includes a main over-center mounting ring or first ring 36 having an internal, concave or spherical inside surface 36a which mates with the exterior, convex surface 11b of the male member 11. The circumferential or angular displacement in the plane of the drawing of the internal surface 36a is less than 90°. The first ring 36 further includes an outer, frustro-conical surface 36b which tapers inwardly toward the leading 11g of the ball member 11. This external, frustro-conical surface 36b is adapted to be guided into the frustro-conical surfaces 15e, 23a and 10f of the female member 10 and the locking assembly 12 as the ball member 11 is moved into a locking position in the cup member 10.

A second, inside mounting ring 37 is mounted in a right-angle groove in the forward end of the first mounting ring 36 and is held in place by a series of circumferentially spaced set screws. The internal mounting ring 37 includes an internal, convex surface 37a which acts as a continuation of the internal, convex surface 36a of the first ring so that the combination of the surfaces 37a and 36a act to independently mount the ring assembly 36 onto the male member. In this manner, the over-center mounting ring assembly is mounted for movement and positioning with respect to the exterior surface 11b of the ball member 11 as the ball member 11 is moved into locking engagement with the cup member 10. The internal surface 37a extends onto the first or front half of the exterior surface 11b to cooperate with the ring 36 to hold the attached rings on the surface. Stated another way, the combined internal surfaces 36a and 37a are over the diametrical apex of a diameter extending through the middle of the spherical surface 11b.

The external surface 36b of the first ring 35 includes an annular, U-shaped groove 36c which receives the radial portion 25a of the radial locking fingers as such locking fingers are moved radially inwardly in response to axial movement of the piston 30.

One application which as been previously described for the apparatus A of this invention is for connecting together a riser pipe with a pipe extending from an ocean floor oil well platform. In this application, the female or cup member 10 is welded onto the bottom end of the riser pipe which extends downwardly from the leg of the riser and terminates at the ocean floor. Hydraulic power is provided down the riser pipe to the female member locking assembly 12. The other flowline is laid from the well head on the ocean floor and terminates in the male or ball end member 11 which initially is laid in proximity to the female member 10. Thereafter, the male member 11 as attached to the ocean floor pipeline is pulled into proximity to the female member or cup member 10. Any protective blanks are then removed by the ROV. Thereafter, as the male member 11 is pulled, by cables or other means, into the female member 10, the outer, frustro-conically tapered surface 36b on the mounting ring 36 engages the internal, frustro-conical guiding surfaces 15e, 23a and 10f to position the locking ring assembly 36 and the ball member 11 into a position for locking engagement with the female member 10. As the ball member is moved into the cup member 10, the locking assembly ring 35 is free to articulate or move with respect to the ball member in order to move it to a final position as illustrated in FIG. 1 wherein the external groove 36 is aligned with the annular groove formed between the front mounting ring 15 and internal mounting ring 23. Then, hydraulic power is applied through ports 19a to move forwardly the piston 30 such that the leading internal curved camming surface 30b of the piston cams against the outer, camming surface 25c on the locking fingers 25 to move the locking fingers 25 downwardly and radially inwardly into the annular groove 36c. Once the locking fingers are fully seated within the annular grooves 36c, the two flowlines have been successfully connected together. The ability to mount the remotely operable locking assembly 12 on the female member 10 and to move the ball member 11 with some pivotal adjustment into the female member 10 is a significant feature of this invention. While a particular application has been described with respect to the use of the apparatus A, it should be understood that the apparatus A may be used to connect together flowlines or pipelines using remotely actuable power in various environments and under various conditions.

The foregoing disclosure and description of the invention are illustrative and explanatory thereof, and various changes in the size, shape and materials, as well as in the details of the illustrated construction may be made without departing from the spirit of the invention.

I claim:

1. Apparatus for connecting together first and second flowline members, comprising:

a female member having a bore therein and being adapted to be connected to a first flowline, said female member having a cup portion formed of a concave interior surface;

a male member having a bore therein and being adapted to be connected to a second flowline, said male member having a ball end portion having a substantially spherical outside surface which includes a nose section for fitting into mating engagement with said concave interior surface of said female member, said male member having a diametrical apex defined by a plane extending through the locus of outermost points of said spherical outside surface and which is perpendicular to the centerline of the bore;

said male member having mounted over said substantially spherical outside surface an over-center mounting ring assembly, said over-center mounting ring assembly being mounted over the diametrical apex of said spherical outside surface for articulation;

said female member including a locking assembly for receiving said over-center mounting ring assembly of said male member, said locking assembly including remotely operable radial lock means for moving radially inwardly into locking engagement with said over-center mounting ring assembly for locking said male member in said female member;

said over-center mounting ring assembly including a first ring having an internal surface which is partially spherical and a second ring attached to said first ring and having a partially spherical internal surface which cooperates with said internal surface of said first ring to provide an over-center internal spherical mounting surface, said first ring having an outside surface portion which is frustro-conical and which tapers downwardly toward said nose section of said male member, said frustro-conical surface portion extending over said diametrical apex;

said locking assembly including said female member including a main body member having at a leading edge said concave interior surface for receiving said nose section of said mounting member; and said locking assembly further including a front mounting ring mounted onto said main body, said front mounting ring having an interior, furstro-conical surface and said main body having an interior frustro-conical surface cooperating to provide an interior, frustro-conical guiding surface for receiving and guiding into a locking position said male member and said over-center mounting ring assembly of said male member.

2. The structure set forth in claim 1, including:
said outside surface portion having a circumferential locking groove therein for receiving said radial lock means to lock said male member in said female member.

3. The structure set forth in claim 1, wherein:
said frustro-conical guiding surface is tapered outwardly from said leading end of said main body.

4. The structure set forth in claim 3, wherein said radial lock means includes:
said front mounting ring having an annular cavity in said interior frustro-conical surface;
a plurality of radial locking fingers being mounted in said annular cavity; and
resilient means for holding said radial locking members in a radially outwardly, withdrawn position at least flush with said interior, frustro-conical guiding surface; and
piston means for moving said radial locking fingers radially inwardly into said circumferential locking groove in said outside surface of said over-center mounting ring.

5. The structure set forth in claim 4, wherein:
each of said radial locking members includes an axial portion and a radial portion.

6. The structure set forth in claim 5, wherein:
said axial portion of each of said radial locking fingers including an outer, tapered end portion having a curved, camming surface; and
said piston means including a piston ring having a front end portion which is tapered to engage said outer tapered portion of each of said radial locking fingers and move said radial locking fingers radially inwardly in response to axial movement of said piston.

7. The structure set forth in claim 1, wherein:
the diameter of said outside spherical surface of said nose section is slightly greater than the diameter of said concave interior surface such that said remotely operable radial lock means locks said nose section in a metal-to-metal seal with said concave interior surface of said female member.

* * * * *